US011287636B2

(12) United States Patent
Tetaz

(10) Patent No.: US 11,287,636 B2
(45) Date of Patent: Mar. 29, 2022

(54) BI-SPECTRAL ANASTIGMAT TELESCOPE

(71) Applicant: THALES, Courbevoie (FR)

(72) Inventor: Nicolas Tetaz, Cannes la Bocca (FR)

(73) Assignee: THALES, Courbevoie (FR)

( * ) Notice: Subject to any disclaimer, the term of this patent is extended or adjusted under 35 U.S.C. 154(b) by 132 days.

(21) Appl. No.: 16/706,507

(22) Filed: Dec. 6, 2019

(65) Prior Publication Data

US 2020/0183143 A1 Jun. 11, 2020

(30) Foreign Application Priority Data

Dec. 11, 2018 (FR) ...................................... 1872518

(51) Int. Cl.
*G02B 23/00* (2006.01)
*G02B 5/10* (2006.01)
*G02B 23/06* (2006.01)
*G02B 5/28* (2006.01)
*G02B 13/14* (2006.01)

(52) U.S. Cl.
CPC ............. *G02B 23/06* (2013.01); *G02B 5/281* (2013.01); *G02B 13/14* (2013.01)

(58) Field of Classification Search
CPC ........ G02B 23/00; G02B 23/02; G02B 23/06; G02B 17/00; G02B 17/02; G02B 17/06; G02B 17/0626; G02B 17/0631; G02B 17/0636; G02B 17/0642; G02B 17/0646; G02B 17/0652; G02B 17/0657; G02B 17/0663
USPC .......................... 359/350–367, 399, 838–860
See application file for complete search history.

(56) References Cited

U.S. PATENT DOCUMENTS

| 5,631,770 A * | 5/1997 | Jarmuz | G02B 17/0808 359/351 |
| 8,534,851 B2 * | 9/2013 | Spencer | G02B 17/0631 359/859 |
| 2018/0335616 A1 * | 11/2018 | Tetaz | G02B 27/0012 |

FOREIGN PATENT DOCUMENTS

| EP | 3 096 169 A1 | 11/2016 |
| EP | 3 404 463 A1 | 11/2018 |

OTHER PUBLICATIONS

Korsch, "Reflective Optics", Academic Press, Technology & Engineering, pp. 261-264, Dec. 2, 2012.

* cited by examiner

*Primary Examiner* — Thong Q Nguyen
(74) *Attorney, Agent, or Firm* — BakerHostetler

(57) ABSTRACT

A Bi-spectral Korsch-type anastigmat telescope has an optical axis and a visible channel comprising a concave first mirror, a convex second mirror and a concave third mirror and a visible detector that is sensitive in a visible band, the mirrors being arranged so that the first mirror and the second mirror form, of an object at infinity, an intermediate image located between the second mirror and the third mirror, the third mirror forming, from this intermediate image, a final image in the visible focal plane of the telescope, wherein the visible detector is placed, an infrared channel comprising first and second mirrors in common with the visible channel, a third IR mirror, a fourth IR mirror, and an IR detector that is sensitive in an infrared band, the third and fourth IR mirrors being configured to form, from the intermediate image, a final image in an IR focal plane.

8 Claims, 6 Drawing Sheets

BI-SPECTRAL ANASTIGMAT TELESCOPE

CROSS-REFERENCE TO RELATED APPLICATIONS

This application claims priority to foreign French patent application No. FR 1872518, filed on Dec. 11, 2018, the disclosure of which is incorporated by reference in its entirety.

FIELD OF THE INVENTION

The field of the invention is that of telescopes, in particular that of observation telescopes placed on board satellites. More precisely, the field of the invention relates to long-focal-length catoptric systems having two channels, a visible channel and an infrared channel.

BACKGROUND

One type of known high-resolution space telescope operating in the visible is the type of telescope referred to as a Korsch telescope (also known as a three-mirror anastigmat (TMA)), an example of which is illustrated in FIG. 1. Korsch telescopes are anastigmat telescopes that include at least three aspherical mirrors in a concave-convex-concave arrangement, namely at least one concave first mirror M10, one convex second mirror M20 and one concave third mirror M30. The first, second and third mirrors M10, M20 and M30 are aspherical and of fixed form, each mirror being characterized by a least two parameters: a radius of curvature R and a conic c.

This optical system has an entrance pupil PE, an optical axis O defined by the ray passing through the centre of the entrance pupil PE and perpendicular to this pupil, the entrance pupil generally being placed in the first mirror, and an exit pupil PS. These notions are well known to those skilled in the art.

The three mirrors M10, M20 and M30 are arranged so that the first mirror and the second mirror form, of an object at infinity, an intermediate image located between the second mirror and the third mirror, the third mirror forming, from this intermediate image, a final image in the focal plane of the telescope, in which a detector D is placed. By applying the Korsch equations, which are well known to those skilled in the art, the respective parameters and positions of the three mirrors are easily calculated. The theoretical solution is of very high quality, this being what makes this type of telescope so advantageous. Typically, Korsch telescopes have a field of view comprised between 0 and 3° and focal lengths of several metres and typically from 3 m to 40 m.

The theoretical solution is calculated on-axis (i.e. the central ray/mean of the field of view is coincident with the optical axis) and does not take into account the physical bulk of the mirrors. In order to allow light to pass into the assembly, provision is conventionally made for the telescope to operate slightly off-axis, i.e. the central ray of the field of view of the telescope no longer coincides with the optical axis (typically the central ray is off axis by about 0.5°). This offset is compensated for in the final design of the telescope.

The space between M10 and M20 is called the front cavity and the space behind M10 is called the rear cavity of the telescope. For reasons of bulk, a steering mirror MR is very often used to decrease the size of the rear cavity, such as illustrated in FIG. 1.

The quality of an optical system is evaluated by comparing the ideal diffraction-limited light wave and the actual light wave at the exit of the optical system, which is affected by the defects of the optical system passed through. Analysis of the difference between the theoretical wave and the actual wave allows the types of defects or aberrations in the optical system to be identified.

It is known that the main types of geometric aberrations are: the spherical aberration, astigmatism, coma, field curvature (defocus in the field) and distortion.

Polynomials, and more particularly Zernike polynomials, are conventionally used to more easily qualify the various types of aberration affecting a wavefront (i.e. surface) at the exit of an optical system.

Zernike surfaces are most commonly used. A Zernike surface is defined in polar coordinates in a space $(\rho, \theta, z)$, and if $z(\rho, \theta)$ is the z-coordinate of a point on the surface, the following relationship is respected $$z(\rho, \theta) = \frac{c(\rho^2)}{1 + \sqrt{1 - (1+k)\, c^2 \rho^2}} + \sum C_j Z_j \qquad \text{[Math 1]}$$

Zj being a Zernike polynomial of jth order and Cj being the constant associated with this polynomial, j being an index varying between 0 and an integer number, k being the conicity constant and c the curvature of the surface.

Any surface that may be decomposed into polynomials may be said to be a φ-polynomial surface. This surface may then be characterized by the values of the coefficients of these polynomials.

The advantage of decomposing a wavefront into orthogonal Zernike polynomials is that each polynomial of the basis in question corresponds to a different category of aberration. It is then possible to determine the nature of the aberrations present in a wavefront.

Table 1 below illustrates various fringe Zernike polynomials as a function of their order (here 1 to 16) and the corresponding type of aberration.

TABLE 1

| Order | Polynomial | Aberraton (s) |
|---|---|---|
| 1 | 1 | Piston |
| 2 | $\rho \cos[\theta]$ | Tilt X |
| 3 | $\rho \sin[\theta]$ | Tilt Y |
| 4 | $-1 + 2\rho^2$ | Defocus |
| 5 | $\rho^2 \cos[2\theta]$ | Astigmatism 0° |
| 6 | $\rho^2 \sin[2\theta]$ | Astigmatism 45° |
| 7 | $\rho(-2 + 3\rho^2) \cos[\theta]$ | Coma X |
| 8 | $\rho(-2 + 3\rho^2) \sin[\theta]$ | Coma Y |
| 9 | $1 - 6\rho^2 + 6\rho^4$ | Spherical and defocus |
| 10 | $\rho^3 \cos[3\theta]$ | Trefoil |
| 11 | $\rho^3 \sin[3\theta]$ | Trefoil |
| 12 | $\rho^2(-3 + 4\rho^2) \cos[2\theta]$ | $2^{nd}$-order astigmatism |
| 13 | $\rho^2(-3 + 4\rho^2) \sin[2\theta]$ | $2^{nd}$-order astigmatism |
| 14 | $\rho(3 - 12\rho^2 + 10\rho^4) \cos[\theta]$ | $2^{nd}$-order coma X |
| 15 | $\rho(3 - 12\rho^2 + 10\rho^4) \sin[\theta]$ | $2^{nd}$-order coma Y |
| 16 | $1 - 12\rho^2 - 30\rho^4 + 20\rho^6$ | $2^{nd}$-order spherical |

Adopting the definition of these fringe Zernike polynomials, the various types of aberration correspond to:
defocus (term Z4)
astigmatism (terms Z5 and Z6)
coma (terms Z7 and Z8)
first-order spherical aberration (term Z9) and
second-order spherical aberration (term Z16).

An aspherical surface is a surface that is not spherical but that is axisymmetric.

Any optical surface without symmetry may be said to be a free-form or φ-polynomial surface when it may be decomposed into a family of polynomials. For example, a surface calculated to compensate for astigmatism and/or coma is free-form if these aberrations are not axisymmetric.

It has recently become necessary to add an infrared (IR) channel to such high-resolution telescopes operating in the visible. This IR channel must comprise a plurality of spectral bands (SWIR, MWIR, LWIR).

This additional IR channel is subject to a certain number of constraints. This IR channel must comprise a plurality of spectral bands (SWIR, MWIR, LWIR), this requiring the IR channel to be achromatic in a very wide spectral band. Moreover, the infrared detector Dir must be cooled (typically to 77 K) by being placed in a cryostat or baffle. In the infrared, any hot body radiates, this being a source of parasitic light, and the detector Dir must be surrounded by cold bodies. The exit pupil Psir of the IR channel of the telescope must be real and cold, and therefore integrated into the cryostat 20 as illustrated in FIG. 2. This requires the PSir-PFir distance, with PFir the focal plane of the IR channel in which the detector Dir is position, to be minimized in order to decrease the complexity and cost of the cooling system of the telescope. It is sought to obtain a PSir-PFir distance smaller than 100 mm and preferably smaller than 40 mm. Furthermore, the IR channel must be as compact as possible in order to avoid increasing the volume and weight of the instrument. The number of optics to be added must be as low as possible in order to decrease the cost and difficulties of integration.

A first prior-art solution consists in reimaging the exit pupil of the telescope with refractive optics. The IR channel is separated from the visible channel (referenced VIS) by a dichroic component (spectral separation) or by means of an off-axis angle different from that of the VIS channel (spatial separation); the focal plane PFir is reimaged by an additional mirror and a group of lenses. In this case, the exit pupil PSir may be placed close to the focal plane PFir. This solution is of large bulk, requires a high number of additional optics and has a limited achromatism because of the use of a group of lenses.

A second solution consists in reimaging the exit pupil of the telescope with catadioptric optics. The IR channel is separated from the VIS channel by a dichroic component or by means of an off-axis angle different from that of the VIS channel; the focal plane PFir is reimaged by two collimated parabolic mirrors, this meeting the constraints of achromatism in all the IR band. However, this solution is of large bulk, as the exit pupil cannot be placed close to the focal plane, and requires two mirrors to be added.

A third solution consists in forming an IR channel comprising a mirror 30 specific to the IR channel, in combination with M10 and M20, which are common to the visible channel, and a group of lens GL (typically 5 to 7 lenses). The IR channel of this solution is illustrated in FIG. 3. The visible channel is of the same type as that illustrated in FIG. 1; however, the rays and components corresponding to the visible channel had not been shown in FIG. 3 for the sake of clarity. This system has the advantage that the IR exit pupil PSir may be positioned close to the detector Dir (compact solution). However, the use of a group of lenses GL limits the spectral band. Furthermore, this group GL is difficult to calculate and to produce, and also very difficult to test/adjust. Specifically, this set of lenses also compensates for the aberrations present in the IR assembly of the telescope and cannot therefore be tested in isolation. Typically this unit is manufactured by a contract manufacturer and tested by the contract manufacture using a telescope simulator. This operating mode is very resource intensive to implement and substantially increases the cost of the IR channel.

SUMMARY OF THE INVENTION

One aim of the present invention is to remedy the aforementioned drawbacks by providing a wide-band and compact bi-spectral (visible and IR) anastigmat telescope with an IR channel that is easy to manufacture and to adjust, and that has an exit pupil close to the detector.

The subject of the present invention is a bi-spectral Korsch-type anastigmat telescope having an optical axis and comprising:

a visible channel comprising three mirrors, a concave first mirror, a convex second mirror and a concave third mirror and a visible detector that is sensitive in a visible band, the mirrors being arranged so that the first mirror and the second mirror form, of an object at infinity, an intermediate image located between the second mirror and the third mirror, the third mirror forming, from this intermediate image, a final image in the visible focal plane of the telescope, in which the visible detector is placed, an infrared channel comprising first and second mirrors in common with the visible channel, a third IR mirror, a fourth IR mirror, and an IR detector that is sensitive in an infrared band, the third and fourth IR mirrors being configured to form, from said intermediate image, a final image in an IR focal plane of the telescope, in which the IR detector is placed, the forms and positions of the third and fourth IR mirrors being defined using Korsch equations generalized to 4 mirrors with the constraint of the first and second mirrors common with the visible channel.

According to a first variant, the third and fourth IR mirrors each have a nonzero tilt angle with respect to the optical axis, the third and fourth mirrors furthermore being configured to compensate for the aberrations introduced by said tilt angles. Preferably, the aberrations introduced by said tilt comprise at least astigmatism and coma. Preferably, the tilt angle of each of the third and fourth mirrors is comprised between 3° and 45°.

According to one embodiment, the telescope according to the invention comprises another visible channel having first and second mirrors in common with the initial visible channel, an additional third mirror having characteristics identical to those of the third mirror of the initial visible channel and an additional visible detector, the fields of the two visible channels being symmetrically off-axis with respect to the optical axis.

According to another variant, the field of the infrared channel is furthermore configured to be off-axis. Preferably, the field is off-axis by between 0.2° and 2°.

According to one embodiment, the third mirror is convex and the fourth mirror is concave.

Preferably, the infrared channel has an IR focal length and an exit pupil and the third and fourth mirrors are furthermore defined so that the distance between said exit pupil of the infrared channel and the IR detector is smaller than said IR focal length divided by 10.

The following description presents a plurality of examples of embodiments of the device of the invention: these examples do not limit the scope of the invention. These examples of embodiments have both features that are essential to the invention and additional features related to the embodiments in question.

BRIEF DESCRIPTION OF THE DRAWINGS

The invention will be better understood and other features, aims and advantages thereof will become apparent on reading the following detailed description with reference to the appended drawings, which are given by way of nonlimiting example, and in which.

Figure 1:
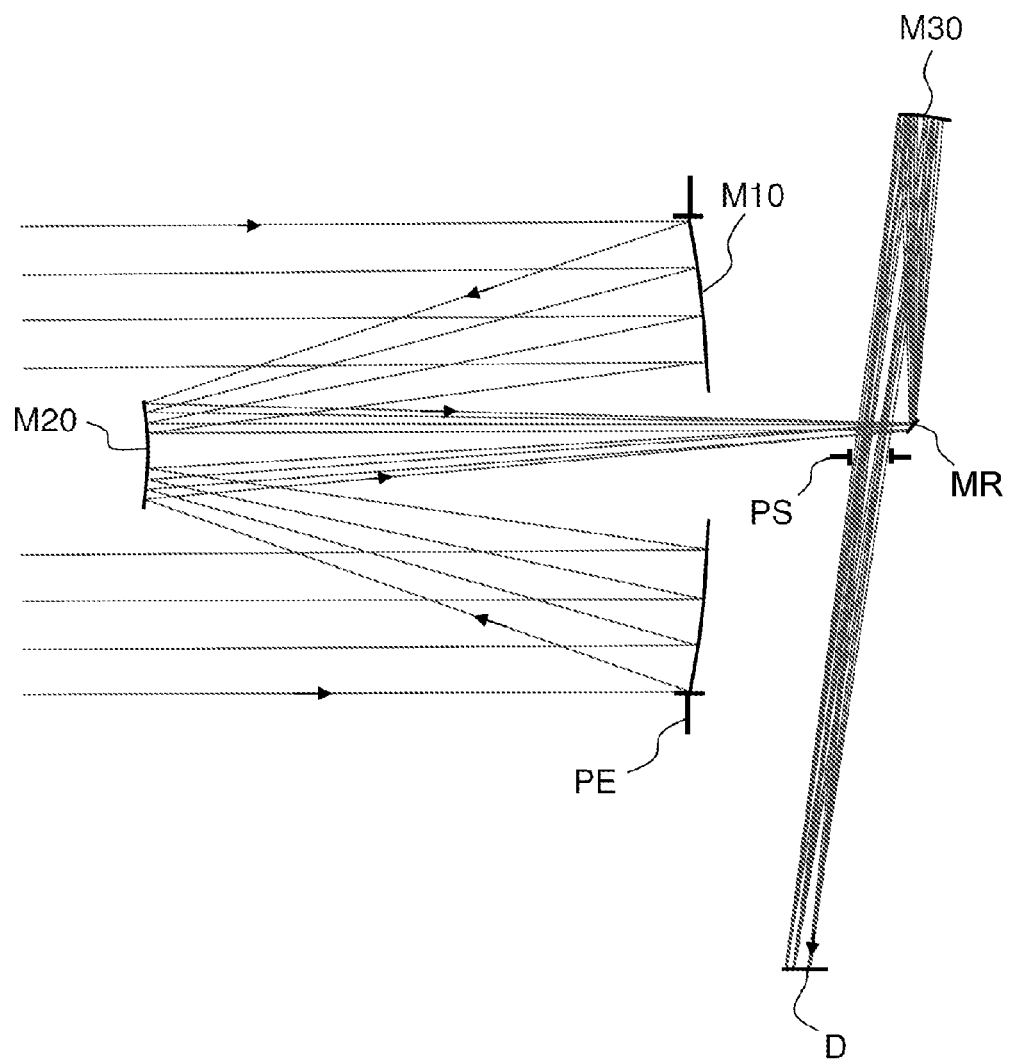
FIG. 1, which has already been cited, illustrates the schematic of a Korsch telescope.
Figure 2:
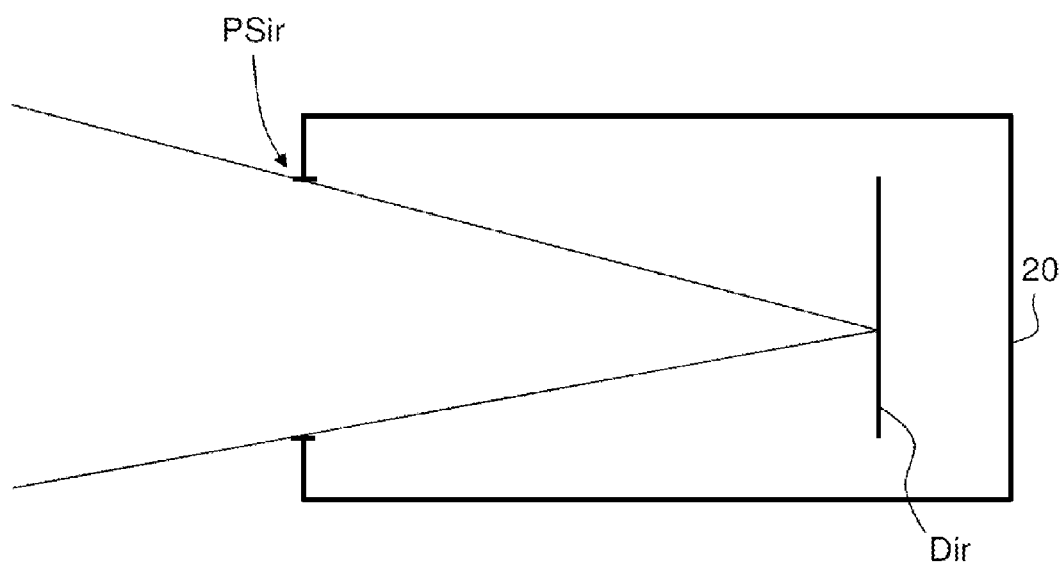
FIG. 2, which has already been cited, illustrates an IR detector in the interior of a cryostat.
Figure 3:
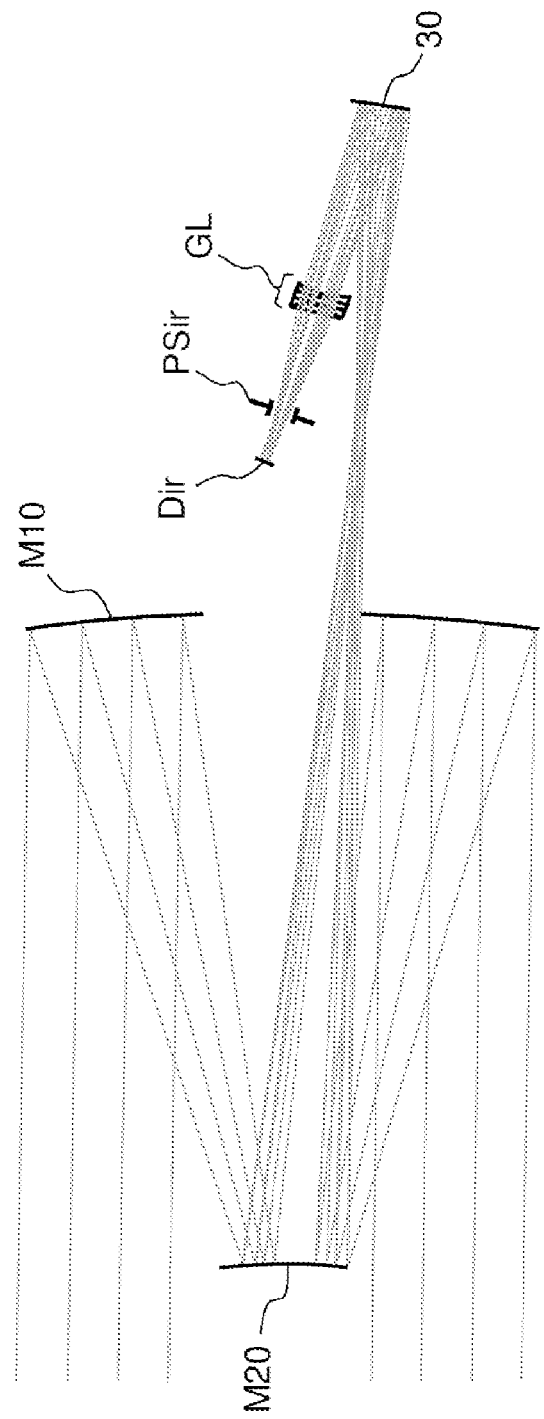
FIG. 3, which has already been cited, illustrates the IR channel of a bi-spectral telescope according to the prior art.

For the sake of clarity, elements that are the same have been referenced with the same references in all the figures.

DETAILED DESCRIPTION

The subject of the invention is a bi-spectral Korsch-type anastigmat telescope 10 that has a visible channel and an infrared channel. The visible channel is conventional or similar to a conventional assembly. It comprises three aspherical mirrors, a concave first mirror M1, a convex second mirror M2 and a concave third mirror M3 and a visible detector D that is sensitive in the visible band, the mirrors being arranged so that the first mirror and the second mirror M2 form, of an object at infinity, an intermediate image located between the second mirror and the third mirror, the third mirror M3 forming, from this intermediate image, a final image in the visible focal plane of the telescope, in which the visible detector D is placed.

Preferably, the mirrors M1, M2 and M3 are aspherical. However, as explained below, other combinations are possible with at least one mirror among these three mirrors of free-form type.

The infrared channel of the telescope according to the invention comprises M1 and M2 in common with the visible channel, a third IR mirror M3 ir, a fourth IR mirror M4 ir and an IR detector Dir that is sensitive in an infrared band, the third and fourth IR mirrors being configured to form, from said intermediate image, a final image in an IR focal plane of the telescope, in which the IR detector Dir is placed.

The optical assembly of the telescope according to the invention solely contains mirrors that may each be independently adjusted. The telescope is manufactured using a conventional mirror-telescope integration process. In addition, this fully reflective solution has no problem with chromatism and may therefore operate in any (IR or VIS) band. The pupil is not reimaged and hence the telescope according to the invention is compact. The telescope according to the invention has a VIS channel and an IR channel that function independently and in parallel, this allowing images to be acquired simultaneously in both bands.

To obtain a telescope having a good image quality in both channels solely using mirrors, the forms and positions of the third and fourth IR mirrors are defined using Korsch equations generalized to 4 mirrors, with the constraint of M1 and M2 common with the visible channel.

The optical assembly of the IR channel of the telescope 10 according to the invention is calculated by applying Korsch equations generalized to n mirrors with n=4. In his book "Reflective Optics" D. Korsch presents a mathematical formalism allowing, in multi-mirror systems, the main optical aberrations (spherical aberration, coma, astigmatism, field curvature) to be expressed as a function of simple parameters such as the distance between the mirrors, the distance of the objects and images and the ratio of the heights of the rays. This simple and effective formalism allows aplanatic and anastigmat multi-mirror systems to be defined by solving a few equations.

Obtaining an assembly that is high-performance both in the visible channel and in the infrared channel requires an optimization in several steps.

Firstly, in a first step, an optical assembly of the visible channel of the telescope 10 is calculated by applying conventional Korsch equations to 3 mirrors on the basis of preset parameters desired for the intended application: visible focal length F, field of view, size of the entrance pupil and constraint on the volume.

The optimization is carried out in a conventional way using optical simulation software packages (CodeV, Zemax, Oslo, etc.). These software packages work on the principle of minimization of an error function. Typically, the error function includes the image quality in the focal plane, as defined by a preset criterion. The preset criterion is for example a wavefront error averaged over a plurality of points of the field (which error is minimized) this criterion being well known to those skilled in the art. Typically it is sought to minimize the root mean square value or WFE RMS.

One solution assembly is characterized by the distances M1/M2, M2/M3 and M3/PF and the radii of curvature R1, R2, R3 and conics C1, C2, C3 of M1, M2 and M3, respectively.

These 3-mirror Korsch equations yield a set of solutions and one of these solutions is arbitrarily chosen as a starting point for the visible channel (initial visible solution) also taking into account mechanical constraints.

The final assembly, which integrates the visible channel M1/M2/M3 and the IR channel M1/M2/M3ir/M4ir, is obtained by conjointly optimizing the two channels.

The optimization is conjoint, i.e. it is not carried out solely on the mirrors M3ir and M4ir (using equations generalized to n=4) while leaving unchanged the M1 and M2 of the initial visible solution. Relaxation of the constraints on at least one parameter of M1 and of M2 of the initial visible solution (chosen among position, radius of curvature and conic) is necessary to converge to a high-quality visible and IR solution. In other words, the final mirrors M1/M2 are not exactly identical (but are however similar to) those determined via the conventional calculation in the visible and chosen arbitrarily as starting point (initial visible solution) among the set of possible solutions. The conjoint optimization allows, among the set of solutions determined in the first step, the visible combination that is best for the IR channel to be identified.

For the calculation of the IR channel, the preset parameters are IR focal length Fir, IR field of view and where appropriate the distance between the IR exit pupil and IR detector (see below).

Thus, the visible channel M1/M2/M3 satisfies the 3-mirror Korsch equations, the infrared channel M1/M2/M3ir/M4ir satisfies the Korsch equations generalized to 4 mirrors, and the characteristics of the mirrors M1/M2 common to the two channels are determined by conjoint optimization of the two channels, typically starting with an initial visible solution.

As explained above, the solutions to the Korsch equations are calculated on-axis (valid for 3 and 4 mirrors). As explained above, such a solution is not compatible with the passage of the light and with the mechanicals constraints due to the bulk of the mirrors.

Figure 4:
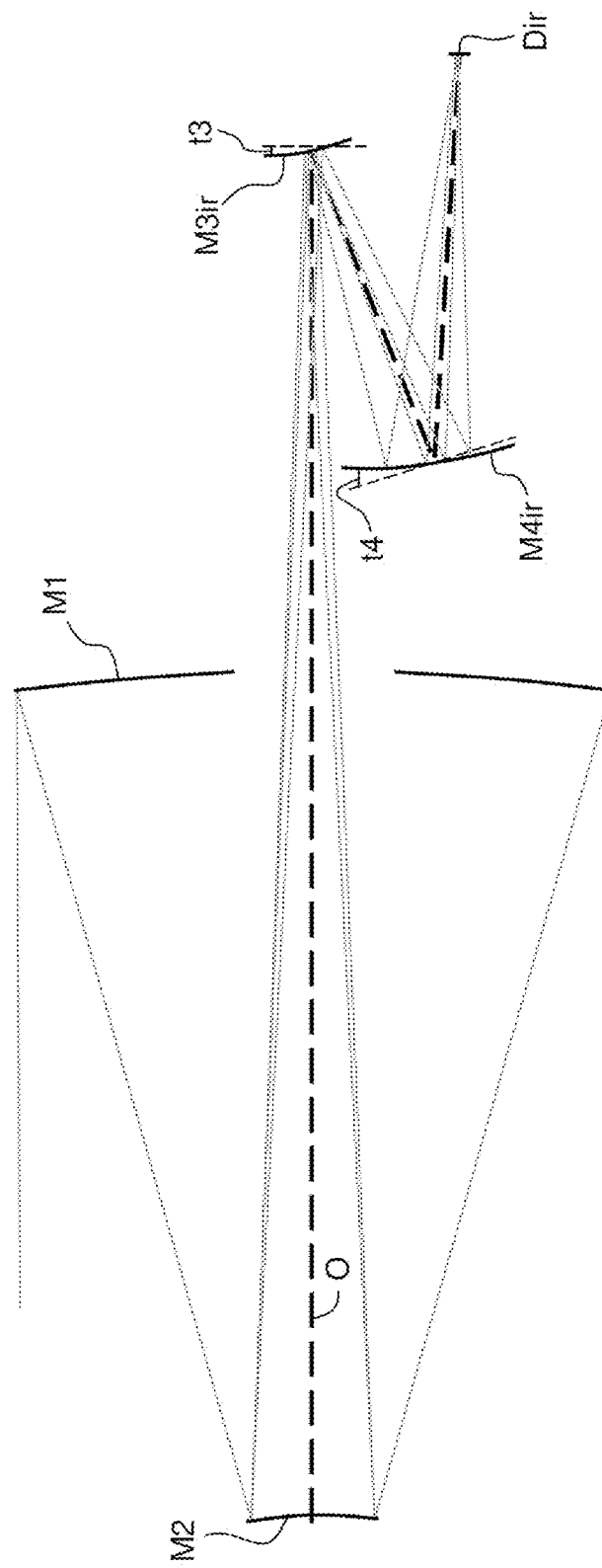
FIG. 4 illustrates a first variant of the IR channel of the telescope according to the invention.

To remedy this, in the IR channel, and in a first preferred variant, the third and fourth mirrors M3*ir* and M4*ir* each have a nonzero respective tilt angle t3, t4 with respect to the optical axis O. An example of a schematic of a first variant is illustrated in FIG. 4 (only the IR channel of the telescope has been shown for the sake of clarity). The inclination of M3*ir* and M4*ir* allows the light rays to be "let pass", but leads to aberrations that decrease image quality. M3*ir* and M4*ir* are therefore furthermore configured to compensate for the aberrations introduced by the tilt angles t3 and t4.

The mirrors M3*ir* and M4*ir* calculated using the Korsch equations are initially aspherical. However, the aberrations introduced by the tilt of M3*ir* and M4*ir* comprise at least astigmatism (Z5, Z6) and coma (Z7, Z8). To compensate for this type of aberration, it is then necessary for M3*ir* and M4*ir* to each have a free-form surface. The values of the tilt angles t3 and t4 are therefore chosen on the one hand in order to allow light to pass and on the other hand so that the aberrations introduced by each of the tilts are compensatable by addition of a free-form component to the aspherical surfaces of M3*ir* and M4*ir*. In certain configurations, it may prove to be necessary to tip the focal plane slightly. Typically each of the angles t3 and t4 is comprised between 3° and 45°.

Figure 5:
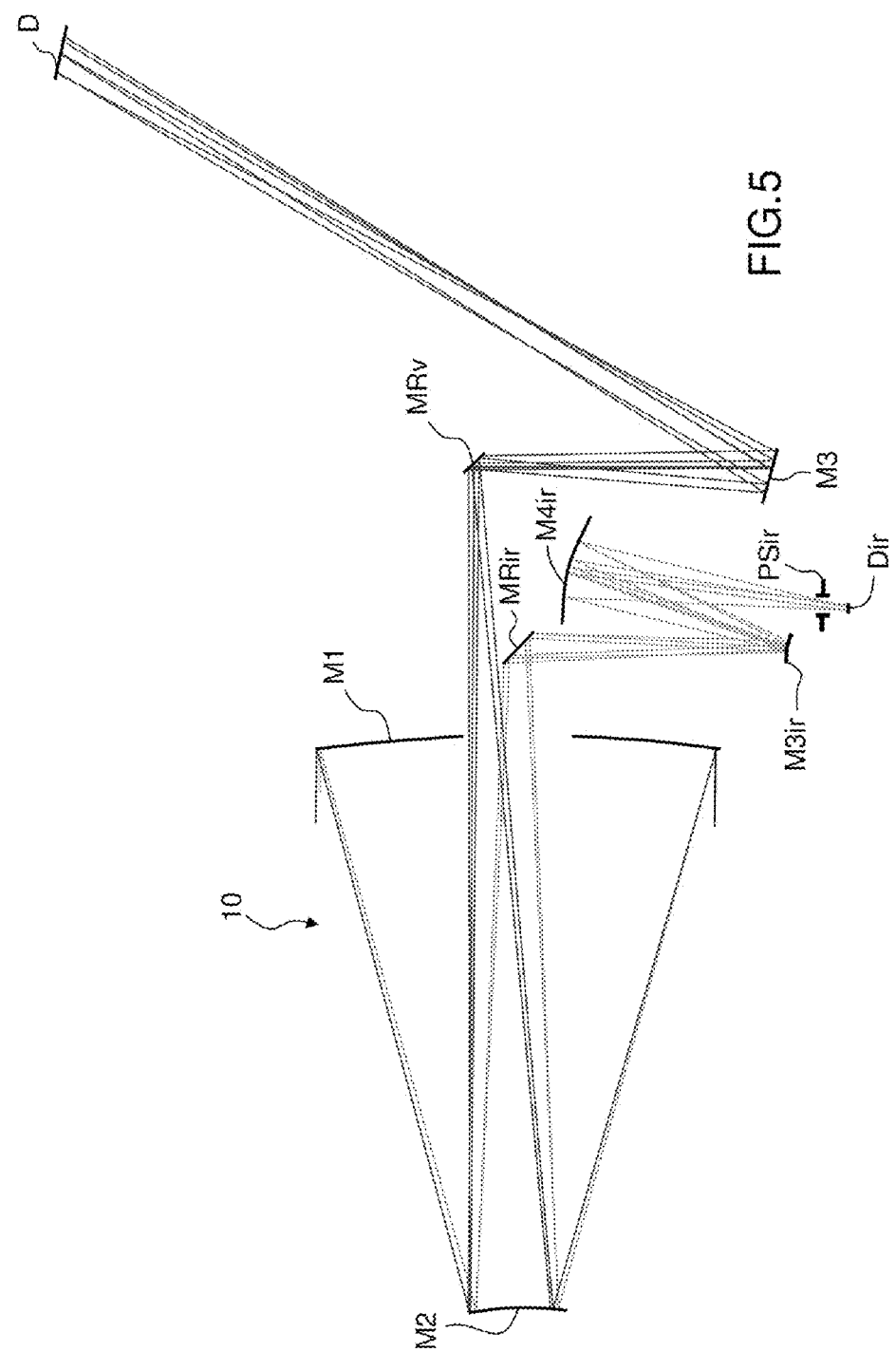
FIG. 5 illustrates a bi-spectral telescope according to the invention.

FIG. 5 illustrates a telescope 10 according to the invention with two channels. In the example of FIG. 5, the separation of the two channels is spatial, i.e. the two channels have different fields of view. The visible channel is slightly off-axis (i.e. the mean field is different from the optical axis) whereas the IR channel here is on-axis (the mean field is coincident with the optical axis) with mirrors M3*ir* and M4*ir* inclined. It is this on-axis/off-axis difference that allows the two channels to be separated spatially after the second mirror.

According to one embodiment of this first variant, the telescope according to the invention comprises another visible channel having M1 and M2 in common with the initial visible channel and the IR channel, an additional third mirror different from the M3 of the initial visible channel but having characteristics identical thereto and an additional visible detector. Preferably, the fields of the two visible channels are symmetrically off axis with respect to the optical axis, i.e. the axis of one visible channel is the symmetric of the axis of the other channel with respect to O, one of the fields typically being off-axis by about 0.5° with the other off-axis by about −0.5°. The two visible channels operate in stereo. This stereo operation allows two images of a given scene to be obtained at 2 different angles, this allowing a three-dimensional view of the scene to be reconstructed. A Korsch telescope comprising two visible channels the fields of which are symmetrically off-axis with respect to the optical axis is known to those skilled in the art.

Conventionally at least one steering mirror MRv located in the visible channel and one steering mirror MRir located in the IR channel allow the rear cavity to be decreased inside in order to decrease bulk.

Figure 6:
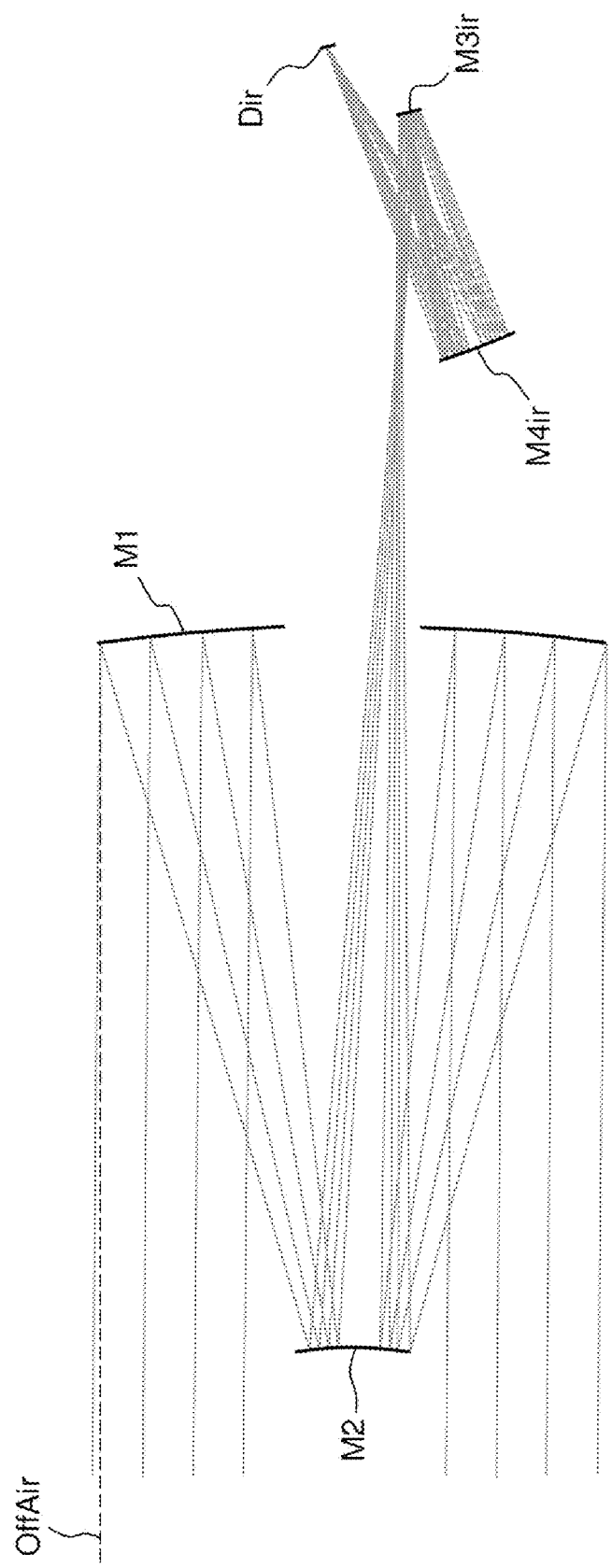
FIG. 6 illustrates a second variant of the IR channel of the telescope according to the invention.

According to a second variant, which is illustrated in FIG. 6, to remedy the fact that the on-axis solution is not compatible with the passage of the light and with the mechanical constraints due to the bulk of the mirrors, the infrared channel is configured so that it also has a field that is off-axis OffAir. Typically, the field is off-axis by between 0.2° and 2°. It is here a question of the same type of solution as that conventionally used for the visible channel. The amounts by which the visible channel and the IR channel are off-axis must then be different in order to be able to achieve a spatial separation of the two channels.

This offset OffAir of the field is compensated for in the optical assembly of the IR channel by modifying M3*ir* and M4*ir*. The aberrations introduced by this slightly off-axis operation are compensatable with aspherical optics. Thus, in this case the parameters of the aspherical mirrors M3*ir* and M4*ir* (radius of curvature and/or conicity) are very slightly modified without introducing any free-form component.

According to a third variant, the VIS and IR channels operate on-axis, with at least M3 (visible channel) tilted and having a free-form surface.

According to another variant, the mirrors M1 and M2 are tilted and have a free-form surface, so as to achieve a telescope having a larger field and to remove the central obstruction, as described in document EP3096169.

According to one preferred embodiment, the third mirror M3*ir* is convex and the fourth mirror M4*ir* is concave.

According to one embodiment, under the constraints applied to the calculation of the optical assemblies, the position and parameters of the mirrors M3*ir* and M4*ir* are furthermore defined so that the distance between said exit pupil PSir of the IR channel and the IR detector Dir is small, such as illustrated in FIG. 5. The smallest distance possible is sought given the intended application and the bulk of the associated telescope. Typically, this distance is chosen to be smaller than the value of the IR focal length Fir divided by 10, and preferably by 100.

According to another variant, the channels are separated spectrally using a dichroic component. In this case, the respective mean fields of the VIS and IR channels must be almost identical.

The invention claimed is:

1. A Bi-spectral Korsch-type anastigmat telescope having an optical axis (O) and comprising:
    a visible channel comprising a concave first mirror (M1), a convex second mirror (M2) and a concave third mirror (M3) and a visible detector (D) that is sensitive in a visible band, the mirrors being arranged so that the first mirror (M1) and the second mirror (M2) form, of an object at infinity, an intermediate image located between the second mirror and the third mirror, the third mirror (M3) being configured to form, from this intermediate image, a final image in a visible focal plane of the telescope, wherein the visible detector (D) is placed; and
    an infrared channel comprising first and second mirrors in common with the visible channel, a third IR mirror (M3*ir*), a fourth IR mirror (M4*ir*), and an IR detector (Dir) that is sensitive in an infrared band, the third and fourth IR mirrors being configured to form, from said intermediate image, a final image in an IR focal plane of the telescope, wherein the IR detector (Dir) is placed, forms and positions of the third and fourth IR mirrors being defined using Korsch equations generalized to 4 mirrors with a constraint of the first and second mirrors (M1, M2) common with the visible channel.

2. The telescope of claim 1, wherein the third and fourth IR mirrors each having a nonzero tilt angle (t3, t4) with respect to the optical axis (O), the third and fourth mirrors furthermore being configured to compensate for aberrations introduced by said tilt angles (t3, t4).

3. The telescope of claim 2, wherein the aberrations introduced by said tilt angles (t3, t4) comprise at least astigmatism and coma.

4. The telescope of claim 2, wherein said tilt angle (t3, t4) of each of the third and fourth mirrors is between 3° and 45°.

5. The telescope of claim 1, wherein a field of the infrared channel is furthermore configured to be off-axis (OffAir).

6. The telescope of claim 5, wherein said field is off-axis by between 0.2° and 2°.

7. The telescope of claim 1, wherein the third mirror is convex and the fourth mirror is concave.

8. The telescope of claim 1, wherein the infrared channel has an IR focal length (Fir) and an exit pupil (Psir) and wherein the third and fourth mirrors (M3*ir*, M4*ir*) are furthermore defined so that a distance between said exit pupil (PSir) of the infrared channel and the IR detector (Dir) is smaller than said IR focal length (Fir) divided by 10.

\* \* \* \* \*